(12) United States Patent
Fenderson et al.

(10) Patent No.: US 11,713,246 B2
(45) Date of Patent: Aug. 1, 2023

(54) LIQUID SULFUR DEGASSING

(71) Applicant: FLUOR TECHNOLOGIES CORPORATION, Sugar Land, TX (US)

(72) Inventors: Stephen N. Fenderson, Gladewater, TX (US); Thomas K. T. Chow, Villa Park, CA (US)

(73) Assignee: Fluor Technologies Corporation, Irving, TX (US)

( * ) Notice: Subject to any disclaimer, the term of this patent is extended or adjusted under 35 U.S.C. 154(b) by 323 days.

(21) Appl. No.: 16/816,484

(22) Filed: Mar. 12, 2020

(65) Prior Publication Data

US 2020/0290874 A1    Sep. 17, 2020

Related U.S. Application Data

(60) Provisional application No. 62/819,051, filed on Mar. 15, 2019, provisional application No. 62/829,332, filed on Apr. 4, 2019.

(51) Int. Cl.
*C01B 17/02* (2006.01)
*B01D 19/00* (2006.01)

(52) U.S. Cl.
CPC ...... *C01B 17/0232* (2013.01); *B01D 19/0005* (2013.01); *B01D 19/0063* (2013.01)

(58) Field of Classification Search
CPC ..... C01B 17/02; C01B 17/0232; B01D 19/00; B01D 19/0005; B01D 19/0063
See application file for complete search history.

(56) References Cited

U.S. PATENT DOCUMENTS

| 4,729,887 A | 3/1988 | Pendergraft |
| 4,755,372 A | 7/1988 | Baker |
| 4,844,720 A | 7/1989 | Pendergraft et al. |
| 5,030,438 A * | 7/1991 | Voirin ................. C01B 17/0232 423/578.1 |
| 5,632,967 A | 5/1997 | Nasato |
| 6,010,677 A | 1/2000 | Scheybeier |
| 6,444,116 B1 | 9/2002 | Galiasso et al. |
| 7,081,233 B2 * | 7/2006 | Louie ................. C01B 17/0232 422/219 |
| 8,084,013 B2 | 12/2011 | Tonjes et al. |
| 8,361,432 B2 | 1/2013 | Parekh et al. |

(Continued)

FOREIGN PATENT DOCUMENTS

| CA | 2232629 C | 3/1997 |
| CA | 3000980 A1 | 4/2017 |

(Continued)

OTHER PUBLICATIONS

Johnson (Choices in automated level detection: Part 1, 2013, Process Technology, www.processonline.com.au). (Year: 2013).*

(Continued)

*Primary Examiner* — Youngsul Jeong
(74) *Attorney, Agent, or Firm* — Conley Rose, P.C.

(57) ABSTRACT

A method and system for liquid sulfur degassing is disclosed. The method and system generally involve degassing liquid sulfur in a degassing vessel, and the level of the liquid sulfur in the degassing vessel is controlled in the degassing vessel by determining the level of liquid sulfur in the degassing vessel.

10 Claims, 11 Drawing Sheets

(56) References Cited

U.S. PATENT DOCUMENTS

| | | | |
|---|---|---|---|
| 8,663,696 | B2 | 3/2014 | Garg et al. |
| 10,059,588 | B2 | 8/2018 | Fenderson et al. |
| 11,034,583 | B2 | 6/2021 | Fenderson |
| 2009/0188837 | A1 | 7/2009 | Podrebarac |
| 2011/0020212 | A1 | 1/2011 | Tonjes et al. |
| 2012/0138510 | A1 | 6/2012 | Choi et al. |
| 2012/0317873 | A1 | 12/2012 | Johnson et al. |
| 2013/0330260 | A1 | 12/2013 | Liu et al. |
| 2014/0366731 | A1 | 12/2014 | Nougayrede et al. |
| 2014/0377165 | A1 | 12/2014 | Keller |
| 2015/0259205 | A1 | 9/2015 | Borsboom et al. |
| 2018/0319662 | A1* | 11/2018 | Fenderson ............ C01B 17/165 |

FOREIGN PATENT DOCUMENTS

| | | | |
|---|---|---|---|
| CA | 3132311 | A1 | 9/2020 |
| CA | 3000980 | C | 7/2022 |
| CN | 102311765 | A | 1/2012 |
| CN | 102548961 | A | 7/2012 |
| CN | 103402910 | A | 11/2013 |
| CN | 103702939 | A | 4/2014 |
| CN | 10454906 | A | 4/2015 |
| CN | 108367207 | A | 8/2018 |
| CN | ZL201580083667.5 | | 8/2021 |
| CN | 113603062 | A | 11/2021 |
| CN | 113795461 | A | 12/2021 |
| EP | 0851836 | B1 | 1/2000 |
| EP | 0717720 | B1 | 3/2002 |
| EP | 2607304 | B1 | 3/2015 |
| EP | 2347995 | B1 | 11/2015 |
| EP | 3359271 | A1 | 8/2018 |
| EP | 3359271 | B1 | 7/2021 |
| EP | 3938312 | A1 | 1/2022 |
| GB | 2203732 | B | 4/1991 |
| KZ | 34080 | | 12/2019 |
| WO | 199506616 | A1 | 3/1995 |
| WO | 2013006040 | A1 | 1/2013 |
| WO | 2013091972 | A1 | 6/2013 |
| WO | 2014035614 | A1 | 3/2014 |
| WO | 2017061982 | A1 | 4/2017 |
| WO | 2020190676 | A1 | 9/2020 |

OTHER PUBLICATIONS

Office Action dated May 3, 2021, Canadian Patent Application No. 30000980, filed Oct. 5, 2015.
Communication under Rule 71(3) EPC dated Feb. 18, 2021, European Patent Application No. 15905928.6, filed Oct. 5, 2015.
Notice of Allowance dated Feb. 9, 2021, U.S. Appl. No. 16/034,475, filed Jul. 13, 2018.
Office Action dated Dec. 1, 2020, Canadian Patent Application No. 30000980, filed Oct. 5, 2015.
Office Action dated Oct. 29, 2020, Chinese Patent Application No. 201580083667.5, filed Apr. 4, 2018.
PCT International Preliminary Report On Patentability dated Sep. 30, 2021, International Application No. PCT/US2020/022539 filed Mar. 13, 2020.
Office Action dated Oct. 27, 2021, United Arab Emirates Application No. P60004743/18 filed Oct. 5, 2015.
Communication Pursuant to Rules 161(2) and 162 EPC dated Oct. 22, 2021, European Patent Application No. 20774088.7 filed Mar. 13, 2020.
Foreign Communication from a Related Counterpart—International Preliminary Report on Patentability dated Apr. 9, 2018, International Application No. PCT/US2015/054015, filed on Oct. 5, 2015.
Foreign Communication from a Related Counterpart—International Search Report and Written Opinion, dated Jul. 5, 2016, PCT Application No. PCT/US/2015/054015, filed on Oct. 5, 2015, 12 pages.
Chinese Patent Application No. 201580083667.5, filed Apr. 4, 2018, Notice of Entry Into Substantive Examination dated Oct. 15, 2018, 1 page.
Chinese Patent Application No. 201580083667.5, filed Apr. 4, 2018, Office Action dated Mar. 2, 2020.
European Patent Application No. 15905928.6, filed Apr. 10, 2018, EPO Communication Pursuant to Rule 161/162 dated May 16, 2018, 3 pages.
European Patent Application No. 15905928.6, filed Apr. 10, 2018, Extended European Search Report dated Mar. 25, 2019.
European Patent Application No. 15905928.6, filed Apr. 10, 2018, EPO Communication Pursuant to Rules 70(2) and 70a(2) EPC dated Apr. 11, 2019.
European Patent Application No. 15905928.6, filed Apr. 10, 2018, Communication Pursuant to Article 94(3) EPC dated Mar. 16, 2020.
Kazakhstan Patent Application No. 2018/0263.1 filed Oct. 5, 2015, Office Action dated Jul. 11, 2019.
Decision to Grant dated Oct. 4, 2019, Kazakhstan Patent Application No. 2018/0263.1 filed Oct. 5, 2015.
Fenderson, Stephen N. et al., "Liquid Sulfur Degassing", filed Mar. 15, 2019, U.S. Appl. No. 62/819,051.
Fenderson, Stephen N. et al., "Liquid Sulfur Degassing", filed Apr. 4, 2019, U.S. Appl. No. 62/829,332.
Fenderson, Stephen N. et al., "Liquid Sulfur Degassing", filed Mar. 13, 2020, International Application No. PCT/US2020/022539.
Restriction Requirement dated Nov. 18, 2016, U.S. Appl. No. 14/875,096, filed Oct. 5, 2015.
Office Action dated Oct. 5, 2017, U.S. Appl. No. 14/875,096, filed Oct. 5, 2015.
Office Action dated Mar. 22, 2017, U.S. Appl. No. 14/875,096, filed Oct. 5, 2015.
Notice of Allowance dated Apr. 16, 2018, U.S. Appl. No. 14/875,096, filed Oct. 5, 2015.
Office Action dated Feb. 14, 2020, U.S. Appl. No. 16/034,475, filed Jul. 13, 2018.
Advisory Action dated Sep. 9, 2020, U.S. Appl. No. 16/034,475, filed Jul. 13, 2018.
Schaschke, Carl, "Dictionary of Chemical Engineering"—Flame Proofing. Oxford University Press, Retrieved from: https://app.knovel.com/hotlink/df/id:kt00TW5Q11/dictionary-chemical-engineering/flame-proofing, 2014.
Final Office Action dated Jul. 1, 2020, U.S. Appl. No. 16/034,475, filed Jul. 13, 2018.
PCT Search Report & Written Opinion dated May 28, 2020, International Application No. PCT/US2020/022539 filed Mar. 13, 2020.
Johnson, Glenn, Choices In Automated Level Detection: Part 1, Process Technology, Feb. 18, 2013 [Retrieved on Apr. 26, 2020], Retrieved from the Internet: <URL: https://www.processonline.com.au/content/instrumentation/article/choices-in-automated-level-detection-part-1-1305071135>.
Sands, Column Instrumentation Basics, Chemical Engineering Essentials for the CPI Professional, Mar. 15, 2008 [Retrieved on Apr. 22, 2020]. Retrieved from the Internet: <URL: https://www.chemengonline.com/feature-report-column-instrumentation-basics/>.
Office Action dated Jun. 21, 2021, Saudi Arabian Patent Application No. 518391306 filed Oct. 5, 2015.
Notice of Allowance dated Dec. 23, 2021, Canadian Patent Application No. 30000980, filed Oct. 5, 2015.
Office Action dated Nov. 1, 2022, Saudi Arabian Patent Application No. 521430334 filed Mar. 13, 2020.
Office Action dated Feb. 17, 2023, Canadian Patent Application No. 3,132,311, filed Sep. 1, 2021.
Extended European Search Report dated Nov. 29, 2022, European Patent Application No. 20774088.7 filed Mar. 13, 2020.

* cited by examiner

LIQUID SULFUR DEGASSING

CROSS-REFERENCE TO RELATED APPLICATIONS

This application claims the benefit of U.S. Provisional Patent Application No. 62/819,051, filed on Mar. 15, 2019, entitled "Liquid Sulfur Degassing", and U.S. Provisional Patent Application No. 62/829,332, filed on Apr. 4, 2019, entitled "Liquid Sulfur Degassing", each of which is incorporated by reference herein in its entirety.

TECHNICAL FIELD

The present disclosure relates to systems and methods for liquid sulfur degassing.

BACKGROUND

Liquid sulfur degassing involves contacting liquid sulfur with a stripping gas to remove impurities that are contained in the liquid sulfur. The impurities can transfer to the stripping gas, and the process produces a gaseous stream containing the impurities and the stripping gas as well as a degassed liquid sulfur having a reduced amount of impurities. Techniques for liquid sulfur degassing are described in U.S. Pat. Nos. 5,632,967, 8,663,595, and 10,059,588, each of which is incorporated by reference in its entirety. Control of the level of liquid sulfur inside a degassing vessel where stripping of impurities occurs is an ongoing challenge for liquid sulfur degassing.

SUMMARY

A liquid sulfur degassing system comprising: a degassing vessel configured to receive liquid sulfur and a stripping gas therein and to contact the liquid sulfur with the stripping gas so as to produce a bottom stream comprising degassed liquid sulfur and an overhead stream comprising a hydrogen sulfide enriched stripping gas; and a liquid level controller directly or indirectly connected to the degassing vessel and configured to: determine a level of the liquid sulfur in the degassing vessel; and control a level of the liquid sulfur in the degassing vessel based on the level of the liquid sulfur determined for the degassing vessel.

A liquid sulfur degassing system comprising: a degassing vessel configured to receive liquid sulfur and a stripping gas therein and to contact the liquid sulfur with the stripping gas so as to produce a bottom stream comprising degassed liquid sulfur and an overhead stream comprising a hydrogen sulfide enriched stripping gas; a level bridle fluidly connected to the degassing vessel; and a liquid level controller connected to the level bridle and configured to: measure a first level of the liquid sulfur in the level bridle; and control the level of the liquid sulfur in the degassing vessel based on the first level measured for the level bridle.

A method of treating liquid sulfur containing polysulfides and hydrogen sulfide, comprising: contacting the liquid sulfur with stripping gas in a contact zone of a degassing vessel; determining a level of the liquid sulfur in the degassing vessel; and controlling the level of the liquid sulfur in the degassing vessel based on the step of determining.

A method of treating liquid sulfur containing polysulfides and hydrogen sulfide, comprising: contacting the liquid sulfur with stripping gas in a contact zone of a degassing vessel; and measuring a first level of the liquid sulfur in a level bridle that is fluidly connected to the degassing vessel and configured to indicate a second liquid level of the liquid sulfur in the degassing vessel; and controlling the second level of the liquid sulfur in the degassing vessel based on the step of measuring.

A method for retro-fitting a decomposition zone to an existing degassing vessel comprises one or more of: detaching a liquid sulfur feed stream from an inlet of the degassing vessel; attaching an outlet of a vessel structure configured to hold a decomposition catalyst to the inlet of the degassing vessel; attaching an inlet of the vessel structure to the liquid sulfur feed stream; placing a decomposition catalyst in the vessel structure; detaching an existing liquid level controller from the degassing vessel; attaching a level bridle of a configuration disclosed herein to the degassing vessel; and attaching the level bridle to the existing liquid level controller or a second liquid level controller.

A method for retro-fitting a decomposition zone to an existing degassing vessel comprises one or more of: detaching a liquid sulfur feed stream from an inlet of the degassing vessel; attaching a first end of a hydrogen sulfide enriched stream to the inlet of the degassing vessel; attaching a second end of the hydrogen sulfide enriched stream to a vessel structure; attaching an inlet of the vessel structure to the liquid sulfur feed stream; detaching an existing liquid level controller from the degassing vessel; attaching a level bridle of a configuration disclosed herein to the degassing vessel; and attaching the level bridle to the existing liquid level controller or a second liquid level controller.

While multiple embodiments are disclosed, still other embodiments will become apparent to those skilled in the art from the following detailed description. As will be apparent, some embodiments, as disclosed herein, are capable of modifications in various aspects without departing from the spirit and scope of the claims as presented herein. Accordingly, the detailed description hereinbelow is to be regarded as illustrative in nature and not restrictive.

BRIEF DESCRIPTION OF THE DRAWINGS

The following figures illustrate embodiments of the subject matter disclosed herein. The claimed subject matter may be understood by reference to the following description taken in conjunction with the accompanying figures, in which:

Figure 1:
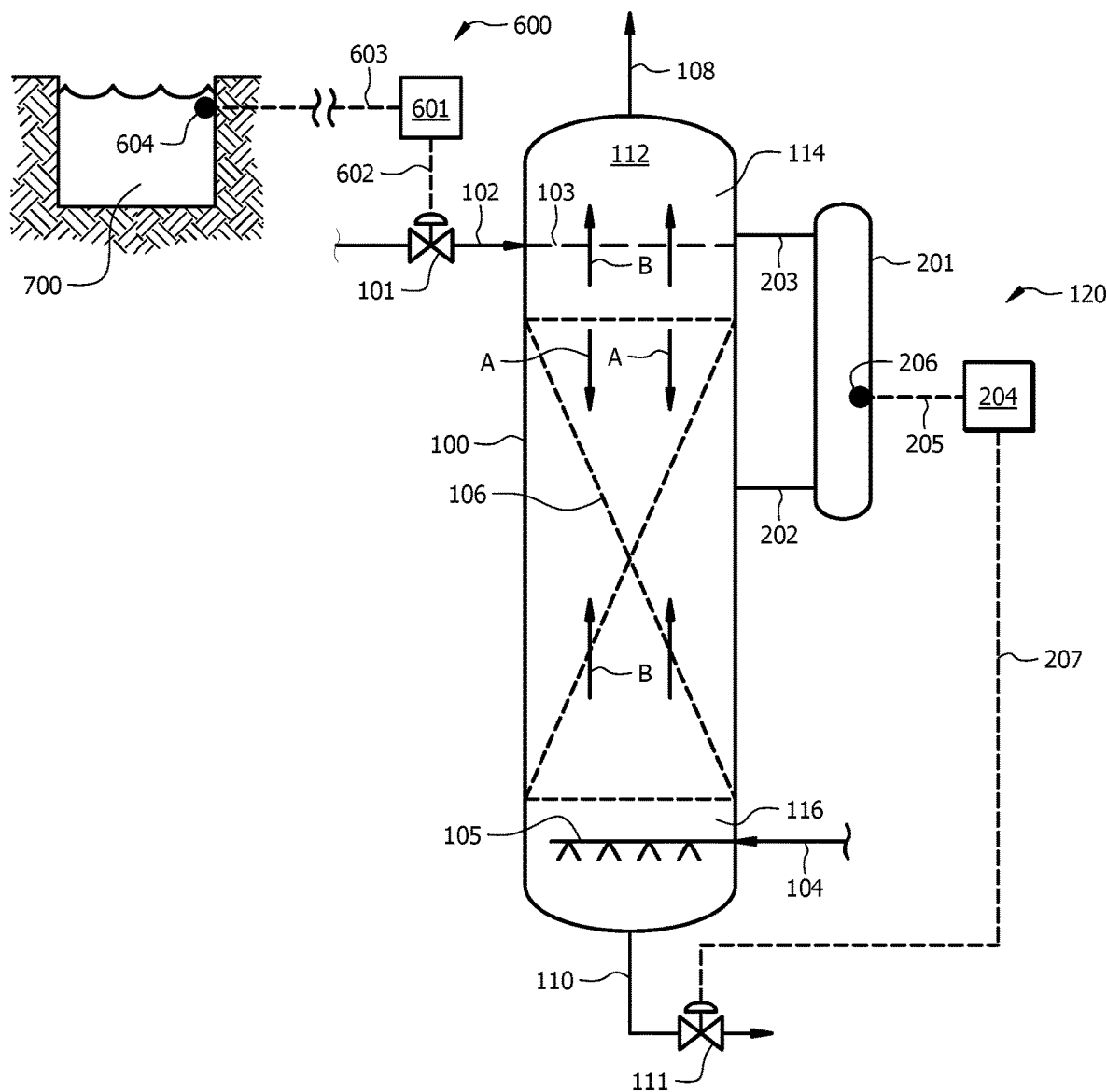
FIG. 1 illustrates a process flow diagram of a degassing vessel configured for liquid sulfur degassing.

Various objects, features, aspects and advantages of the present invention will become more apparent from the following detailed description of embodiments of the invention.

DETAILED DESCRIPTION

It should be understood at the outset that although an illustrative implementation of one or more embodiments are provided below, the disclosed systems and methods may be implemented using any number of techniques, whether currently known or in existence. The disclosure should in no way be limited to the illustrative implementations, drawings, and techniques illustrated hereinbelow, including the exemplary designs and implementations illustrated and described herein, but may be modified within the scope of the appended claims along with their full scope of equivalents. Thus, while multiple embodiments are disclosed, still other embodiments will become apparent to those skilled in the art from the following detailed description. As will be apparent, some embodiments, as disclosed herein, are capable of modifications in various aspects without departing from the spirit and scope of the claims as presented herein. Accordingly, the detailed description hereinbelow is to be regarded as illustrative in nature and not restrictive.

While the following terms are believed to be well understood by one of ordinary skill in the art, the following definitions are set forth to facilitate explanation of the presently disclosed subject matter. Unless defined otherwise, all technical and scientific terms used herein have the same meaning as commonly understood to one of ordinary skill in the art to which the presently disclosed subject matter belongs.

As utilized herein, a "upper portion" of a contact zone or vessel indicates a top $1/3$ of the height of the zone or vessel.

As utilized herein, a "middle portion" of a contact zone or vessel a middle $1/3$ of the height of the zone or vessel.

As utilized herein, a "lower portion" of a contact zone or vessel indicates a lower $1/3$ of the height of the zone or vessel.

As utilized herein, a "stream" includes the composition that flows within the physical structure of piping, conduit, or both. Piping, pipe, and conduit are terms that can be used interchangeably.

Generally, a stream containing liquid sulfur as used herein also contains impurities (e.g., polysulfides and hydrogen sulfide). The primary technique for removing hydrogen sulfide, i.e., degassing the liquid sulfur, involves contacting the liquid sulfur in a degassing vessel with a stripping gas, where the liquid sulfur and stripping gas experience counter-current flow in the degassing vessel. It has been found that the stripping gas causes a layer of froth to form on the surface of the liquid sulfur, and the froth can affect liquid level measurements of some devices, and thus can affect the control of the liquid level in the degassing vessel. There is a need to address liquid level control when frothing caused by the stripping gas occurs.

FIGS. 1-11 illustrate embodiments of a degassing vessel 100 configured for liquid sulfur degassing. Generally, arrows A represent the direction of flow of liquid in the degassing vessel 100, and arrows B represent the direction of flow of gases in the degassing vessel 100.

The degassing vessel 100 will now be described with reference to FIG. 1; however, it is contemplated that like numbers in FIGS. 2-11 represent like features for the degassing vessel 100 in those figures, unless otherwise specified herein.

The degassing vessel 100 can be made of any suitable material (for example, carbon steel or other materials inert to stripping gases, liquid sulfur, polysulfides, hydrogen sulfide gas, or combinations thereof).

The degassing vessel 100 is fluidly connected to a first conduit 102 and a second conduit 104. The degassing vessel 100 is configured to receive a first stream (e.g., a liquid sulfur feed stream) via first conduit 102 and a second stream (e.g., a stripping gas feed stream) via second conduit 104. The first stream in the first conduit 102 can contain liquid sulfur, polysulfides, and hydrogen sulfide, and the second stream in the second conduit 104 can contain a stripping gas. The degassing vessel 100 includes a contact zone 106 configured to contact the first stream received via conduit 102 and the second stream received via conduit 104. The degassing vessel 100 is also configured to produce an overhead stream in conduit 108 containing the stripping gas and hydrogen sulfide, a bottom stream in conduit 110 containing the degassed liquid sulfur. The degassing vessel 100 also can include a liquid level control system 120 configured to control a level of liquid sulfur in the degassing vessel 100.

As discussed above, the first stream containing liquid sulfur containing polysulfides and hydrogen sulfide can flow into the degassing vessel 100 via conduit 102. The liquid can flow downward in the direction of arrows A in the degassing vessel 100 (optionally through a liquid distributor 103) to the contact zone 106. Stripping gas can flow into the degassing vessel 100 via the conduit 104. The gas can flow through a gas distributor 105 and upward in the direction of arrows B in the degassing vessel 100 to the contact zone 106. In the contact zone 106, the stripping gas flows upward in the direction of arrows B and the liquid sulfur flows downward in the direction of arrows A (i.e., counter-current flow of liquid and gas in the degassing vessel 100) such that the liquid and gas contact one another. The contact zone 106 can include a structured packing to increase the contact time and/or contact surface area between the liquid and gas so as to increase degassing efficiency. Examples of structured packing are described in U.S. Pat. No. 8,663,596 which is incorporated herein in its entirety by reference.

Polysulfides and hydrogen sulfide that are dissolved in the liquid sulfur can be removed from the liquid by contacting the liquid with the stripping gas in the degassing vessel 100. That is, contact of the liquid and the stripping gas at the conditions contemplated herein converts polysulfides to hydrogen sulfide, and the converted hydrogen sulfide along with the hydrogen sulfide originally present in the liquid sulfur transfers from the liquid sulfur to the stripping gas. Without being limited by theory, it has been demonstrated that an oxygen-containing stripping gas can oxidize polysulfides and hydrogen sulfide present in the first stream to form $SO_2$ and/or elemental sulfur and strip dissolved hydrogen sulfide from the liquid sulfur. The stripping gas containing the removed hydrogen sulfide can flow out of the contact zone 106 upwardly in the direction of arrows B through the degassing vessel 100 and exits the degassing vessel 100 via the overhead stream contained in conduit 108. The degassed liquid sulfur containing reduced amounts of polysulfides and hydrogen sulfide flows out of the contact zone 106 downwardly through the degassing vessel 100 and exits the degassing vessel 100 via the bottom stream contained in conduit 110. The bottom stream containing the degassed liquid sulfur can include less than about 10 parts per million by weight (ppmw) of combined polysulfides and dissolved hydrogen sulfide gas based on a total weight of components in the bottom stream.

The feed conduit 102 containing the first stream of liquid sulfur containing polysulfides and dissolved hydrogen sulfide can be positioned at the top of the degassing vessel 100; however, alternative positioning of the conduit 102 may be used as long as the position of the conduit 102 is at a height on the degassing vessel 100 that is above the top of the contact zone 106. The first stream may be pumped through conduit 102 into the degassing vessel 100 from any suitable source of liquid sulfur. For example, the first stream may be obtained from a Claus sulfur recovery plant, e.g., from sulfur pit 700 in a Claus plant. The first stream may be heated or cooled to a temperature range from about 121° C. to about 146.2° C. (about 250° F. to about 295° F.), or a range of about 129.4° C. to about 140.6° C. (about 265° F. to about 285° F.), prior to being introduced into the degassing vessel 100. The flow of the first stream in conduit 102 can be controlled with the liquid level controller 601 to maintain a level of liquid sulfur in a sulfur pit 700.

The stripping gas conduit 104 containing the second stream of stripping gas can be positioned at the bottom of the degassing vessel 100; however, alternative positioning of the conduit 104 may be used as long as the position of the conduit 104 is at a height on the degassing vessel 100 that is below the bottom of the contact zone 106. The stripping gas in the second stream can be an oxygen-containing gas such as air, oxygen-enriched air, oxygen mixed with any suitable inert gas (for example, nitrogen and/or carbon dioxide), nitrogen, carbon dioxide, steam, natural gas, Claus tail gas, or combinations thereof. In an aspect, the air does not need to be dried prior to use as a stripping gas. In an aspect, the stripping gas can have low concentrations of hydrogen sulfide, for example, less than 100 ppmv hydrogen sulfide based on a total volume of the stripping gas. Generally, the stripping gas may be provided by any suitable source. In an aspect, the stripping gas may be compressed using a blower or any other suitable device. In an aspect, the stripping gas can include oxygen from about 15% by volume to about 28% by volume; alternatively, from about 21% by volume to about 28% by volume. In an aspect, the stripping gas in the second stream is heated to a temperature in the range of about 65.5° C. to about 148.9° C. (about 150° F. to about 300° F.) prior to being introduced into the degassing vessel 100 via conduit 104.

The flow rate of the second stream in conduit 104 may be established based upon a fixed desired rate, the flow rate of the first stream in conduit 102, the concentration of oxygen in the second stream in conduit 104, or combinations thereof. While any suitable molar ratio of first stream to the second stream can be employed, typically the ratio will range from about 10 to about 60, preferably from about 20 to about 50.

A liquid level control system 600 can be configured to sense and control a flow of the liquid sulfur into the degassing vessel 100 via first stream in conduit 102. The liquid level control system 600 shown in FIG. 1 is partially reproduced in FIGS. 2-7. The liquid level control system 600 can include controller 601, a first link 602, and a second link 603. The controller 601 can be embodied as a computer having a processor, memory, and instructions stored in the memory that cause the processor to execute one or more of the functions described herein for the controller 601. The controller 601 can be electrically coupled with sensors 604 placed in the sulfur pit 700 via link 603, and the controller 601 can be configured to measure the level of liquid in the sulfur pit 700 using signals obtained from the sensor 604, for example, via a differential pressure cell/sensor, radar technology, capacitance technology, or combinations thereof.

The controller 601 is connected to a control valve 101 (placed in conduit 102) via link 602. The controller 601 can be configured to measure the level of liquid in the sulfur pit 700 and to send a signal via link 602 to adjust the control valve 101 so as to adjust a flow of liquid sulfur to the degassing vessel 100. Upon the liquid level control system 600 indicating that the sensed liquid level in sulfur pit 700 is above a target level of liquid, the flow of the first stream in conduit 102 may be increased via actuation of the control valve 101. On the other hand, upon the liquid level control system 600 indicating that the sensed liquid level of the sulfur pit 700 is below a target level, the flow of the first stream in conduit 102 can be decreased via actuation of the control valve 101.

The liquid level control system 120 can be configured to sense and control a level of the liquid sulfur in the degassing vessel 100. The liquid level control system 120 can include a level bridle 201, a first conduit 202, a second conduit 203, and a controller 204. The level bridle 201 can be embodied as a vessel or stand pipe that is vertically oriented and fluidly connected to the degassing vessel 100 via the first conduit 202 and the second conduit 203. In an aspect, the level of liquid in the level bridle 201 is configured to indicate the level of liquid in the degassing vessel 100. The controller 204 is directly connected to the level bridle 201 via link 205 (electrical or pneumatic connection) and configured to measure the level of liquid in the level bridle 201. The controller 204 is not directly connected to the degassing vessel 100.

In an aspect, the level bridle 201 is fluidly connected to the interior 112 of the degassing vessel 100 via a first conduit 202 and a second conduit 203. The first conduit 202 is connected to the level bridle 201 and to the degassing vessel 100, and configured such that liquid, but not froth, from the degassing vessel 100 can flow into and out of the level bridle 201. The first conduit 202 is fluidly connected to the liquid in the contact zone 106 in the degassing vessel 100. FIG. 1 illustrates the first conduit 202 can be fluidly connected to an upper portion of the contact zone 106; however, it is also contemplated that the first conduit 202 can be fluidly connected to a middle portion of a lower portion of the contact zone 106. It is further contemplated that the first conduit 202 can be fluidly connected to an interior space 116 of the degassing vessel 100 that is below the contact zone 106 and above the gas distributor 105. The second conduit 203 is also connected to the level bridle 201 and to the degassing vessel 100. The second conduit 203 can be located on the degassing vessel 100 such that the second conduit is in fluid communication with vapor in the interior 112 of the degassing vessel 100. The second conduit 203 is fluidly connected to a vapor space 114 in the degassing vessel 100 that does not have liquid. In an aspect, the second conduit 203 can be fluidly connected to the vapor space 114 of the degassing vessel 100 that is above the top of the contact zone 106 and above the liquid distributor 103 (that is, for embodiments that include a liquid distributor 103).

The liquid level control system 120 can also include a controller 204 connected to the level bridle 201. The controller 204 can be embodied as a computer having a processor, memory, and instructions stored in the memory that cause the processor to execute one or more of the functions described herein for the controller 204. The controller 204 can be electrically coupled with sensor(s) 206 placed in the level bridle 201, and the controller 204 can be configured to measure the level of liquid in the level bridle 201 using signals obtained from the sensor(s) 206, for example, via a differential pressure cell/sensor, radar technology, capacitance technology, or combinations thereof. In FIGS. 1-4 and 8-11, the controller 204 is not configured to measure the level of liquid in the degassing vessel 100 directly. That is, the level of liquid in the degassing vessel 100 is measured indirectly, in that, the level bridle 201 is configured to indicate the liquid level in the degassing vessel 100, and the controller 204 is configured to read the liquid level in the level bridle 201, and from the measurement taken from the level bridle 201, analyze and calculate the liquid level in the degassing vessel 100. Alternatively, the controller 204 can be configured to analyze and calculate the liquid level in the level bridle 201 based on the measurement taken from the level bridle 201, and the controller 204 can be further configured to calculate the liquid level in the degassing vessel 100 based on correlation data previously received by and stored on the memory of the controller 204.

The controller 204 can be electrically connected to a control valve 111 located in the conduit 110 via link 207. The controller 204 can be configured to send a signal to actuate the control valve 111 so as allow liquid to flow out of the degassing vessel via the bottom stream in conduit 110. Actuating the control valve 111 can control the level of liquid in the degassing vessel 100 based on the measurements obtained from the level bridle 201.

In FIG. 1, the level of liquid sulfur in the degassing vessel 100 can be controlled by the liquid level control system 120 such that the liquid level is between the first conduit 202 and the second conduit 203 of the liquid level control system 120. Additionally or alternatively, the level of liquid sulfur in the degassing vessel 100 can be controlled by the liquid level control system 120 such that the liquid level is below the liquid distributor 103. Additionally or alternatively, the level of liquid sulfur in the degassing vessel 100 can be controlled by the liquid level control system 120 such that the liquid level is above the contact zone 106. Additionally or alternatively, the level of liquid sulfur in the degassing vessel 100 can be controlled by the liquid level control system 120 such that greater than 50, 60, 70, 80, 90, or 100% of the contact zone 106 is submerged in the liquid that is contained in the degassing vessel 100.

Figure 2:
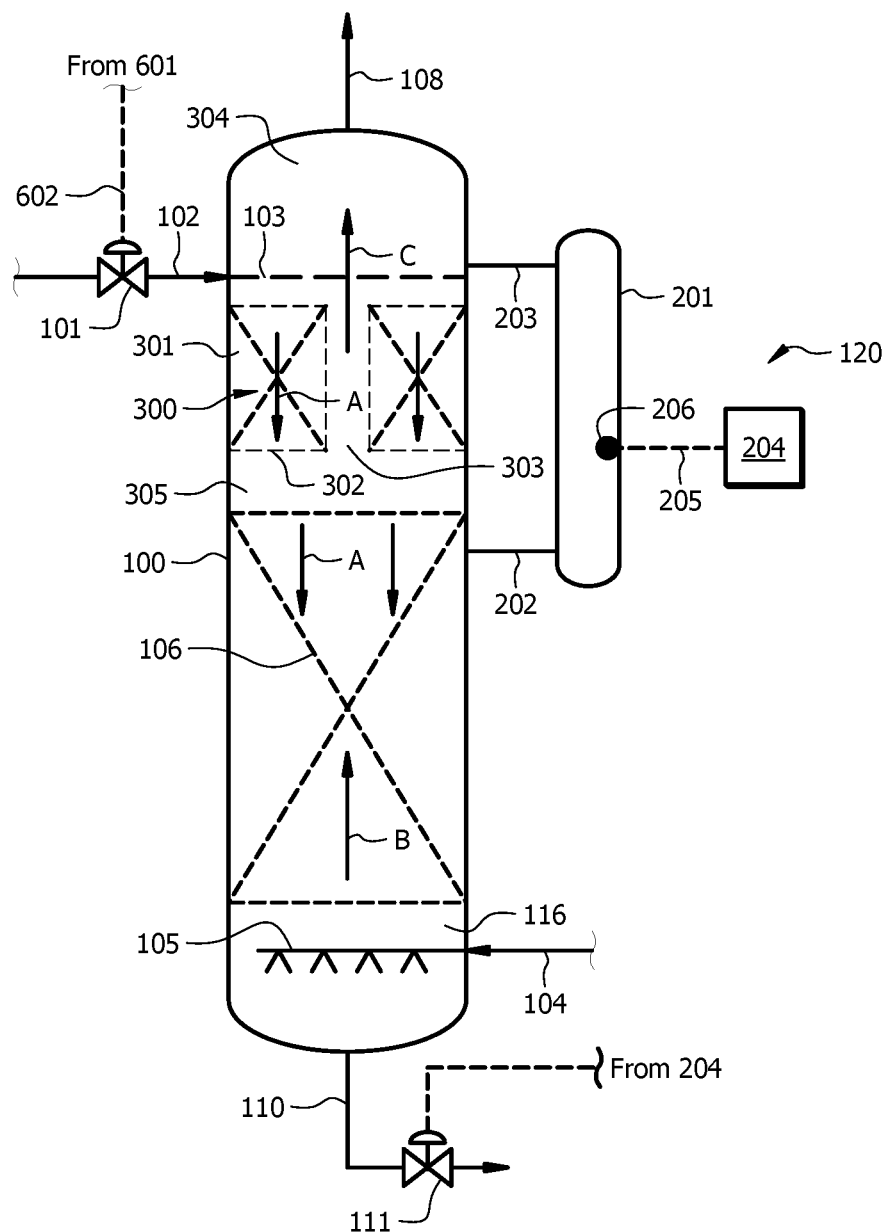
FIG. 2 illustrates another process flow diagram of a degassing vessel configured for liquid sulfur degassing.
Figure 3:
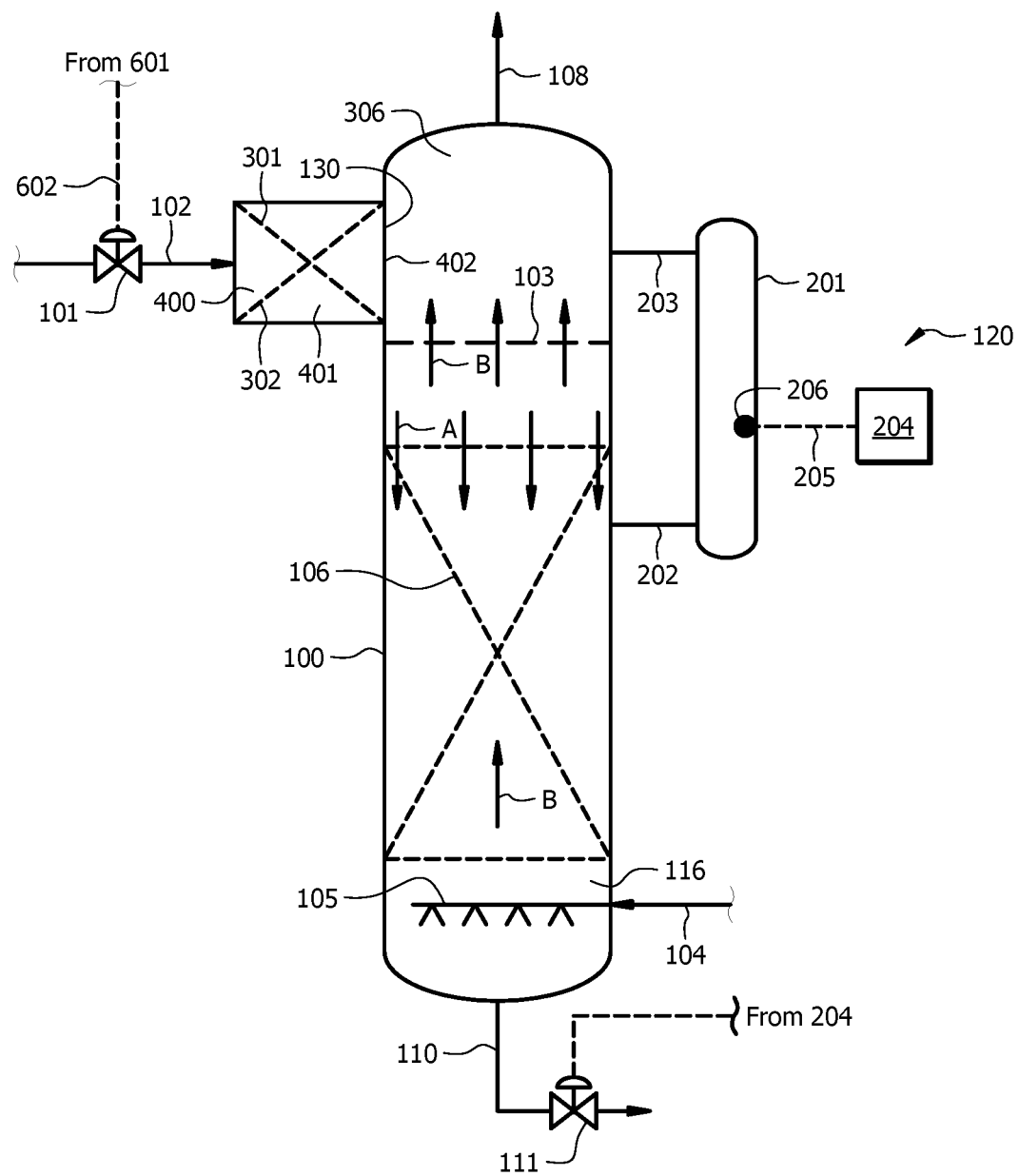
FIG. 3 illustrates another process flow diagram of a degassing vessel configured for liquid sulfur degassing.
Figure 4:
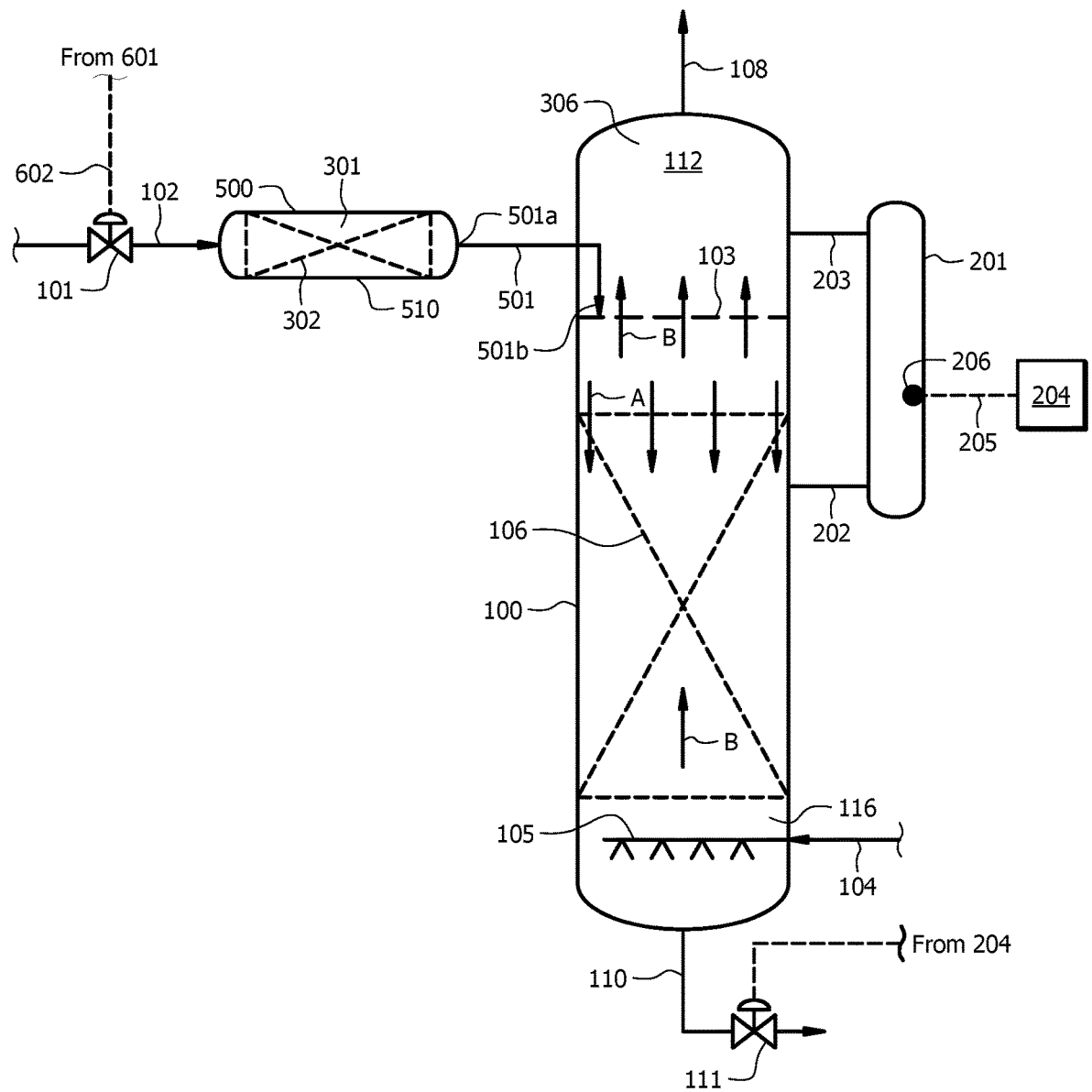
FIG. 4 illustrates another process flow diagram of a degassing vessel configured for liquid sulfur degassing.

The configuration of the degassing vessel 100 in FIGS. 2-4 is the same as shown in FIG. 1, except that a polysulfide decomposition catalyst is added in various configurations.

FIG. 2 illustrates a polysulfide decomposition catalyst 301 is included in a catalyst bed 302 in a polysulfide decomposition zone 300 in the degassing vessel 100. The catalyst bed 302 is generally located within the degassing vessel 100 above the contact zone 106. The gassed liquid sulfur of the first stream enters the degassing vessel 100 via conduit 102 and is first brought into contact with the decomposition catalyst 301 in the ring-shaped catalyst bed 302 of the decomposition zone 300 that is configured for decomposition (or dissociation) of polysulfides to hydrogen sulfide and sulfur. The liquid sulfur is enriched in hydrogen sulfide as the liquid sulfur passes downwardly in the direction of arrows A through the catalyst bed 302. The hydrogen sulfide enriched liquid sulfur then flows into the contact zone 106 that is configured as described for FIG. 1. In the configuration of FIG. 2, while being in a single degassing vessel 100, the decomposition zone 300 and the contact zone 106 are physically separated, e.g., by interior space 305. Fluidization of the decomposition catalyst 301 in the degassing vessel 100 is avoided due to the central opening 303 in ring-shaped catalyst bed 302 because the hydrogen sulfide enriched stripping gas can preferentially pass through the central opening 303 in the direction of arrow C of the ring-shaped catalyst bed 302.

In FIG. 2, it can be seen that the first conduit 202 of the liquid level control system 120 is fluidly connected to the liquid in the contact zone 106 in the degassing vessel 100. FIG. 2 illustrates the first conduit 202 can be fluidly connected to an upper portion of the contact zone 106; however, it is also contemplated that the first conduit 202 can be fluidly connected to a middle portion or a lower portion of the contact zone 106. It is further contemplated that the first conduit 202 can be fluidly connected to an interior space 116 of the degassing vessel 100 that is below the contact zone 106 and above the gas distributor 105.

It can also be seen in FIG. 2 that the second conduit 203 is fluidly connected to a vapor space 304 of the degassing vessel 100 that is above the catalyst bed 302 and above the liquid distributor 103.

In FIG. 2, the level of liquid sulfur in the degassing vessel 100 can be controlled by the liquid level control system 120 such that the liquid level is between the first conduit 202 and the second conduit 203 of the liquid level control system 120. Additionally or alternatively, the level of liquid sulfur in the degassing vessel 100 can be controlled by the liquid level control system 120 such that the liquid level is below the liquid distributor 103. Additionally or alternatively, the level of liquid sulfur in the degassing vessel 100 can be controlled by the liquid level control system 120 such that the liquid level is above the contact zone 106 and above the decomposition catalyst 301 in the catalyst bed 302. Additionally or alternatively, the level of liquid sulfur in the degassing vessel 100 can be controlled by the liquid level control system 120 such that greater than 50, 60, 70, 80, 90, or 100% of the catalyst bed 302 is submerged in the liquid.

FIG. 3 illustrates the polysulfide decomposition catalyst 301 is included in a catalyst bed 302 in a polysulfide decomposition zone 400 attached to a side 130 of the degassing vessel 100. The decomposition zone 400 can be embodied as a vessel structure 401 having the decomposition catalyst 301 placed therein. The vessel structure 401 can be made of the same material as the degassing vessel 100 and attached to the side 130 of the degassing vessel 100 by means known in the art, such as welding. The interior volume of the vessel structure 401 can be less than 50, 40, 30, 20, 10, or 5% by volume of the total interior volume of the degassing vessel 100. Instead of feeding directly to the degassing vessel 100 as is shown and described for FIGS. 1 and 2, the conduit 102 containing the first stream is connected to the vessel structure 401 and is configured to flow liquid sulfur, polysulfides, and hydrogen sulfide to the decomposition zone 400 contained in the vessel structure 401. The decomposition zone 400 (and the vessel structure 401) can be located on an upper portion of the degassing vessel 100 such that the hydrogen sulfide enriched liquid sulfur that leaves the decomposition zone 400 flows into the degassing vessel 100 via outlet 402 of the vessel structure 401 at a location on the side 130 of the degassing vessel 100 that is above the liquid distributor 103. The hydrogen sulfide enriched liquid sulfur then flows downwardly in the direction of arrows A into the contact zone 106 that is configured as described for FIG. 1.

In FIG. 3, it can be seen that the first conduit 202 of the liquid level control system 120 is fluidly connected to the liquid in the contact zone 106 in the degassing vessel 100. FIG. 3 illustrates the first conduit 202 can be fluidly connected to an upper portion of the contact zone 106; however, it is also contemplated that the first conduit 202 can be fluidly connected to a middle portion or a lower portion of the contact zone 106. It is further contemplated that the first conduit 202 can be fluidly connected to an interior space 116 of the degassing vessel 100 that is below the contact zone 106 and above the gas distributor 105.

It can also be seen in FIG. 3 that the second conduit 203 is fluidly connected to a vapor space 306 of the degassing vessel 100 that is above the liquid distributor 103, above the contact zone 106, at a height above the catalyst bed 302, above the liquid level of liquid sulfur in the degassing vessel 100, or combinations thereof.

In FIG. 3, the level of liquid sulfur in the degassing vessel 100 can be controlled by the liquid level control system 120 such that the liquid level is between the first conduit 202 and the second conduit 203 of the liquid level control system 120. Additionally or alternatively, the level of liquid sulfur in the degassing vessel 100 can be controlled by the level control system 120 such that the liquid level is below the liquid distributor 103. Additionally or alternatively, the level of liquid sulfur in the degassing vessel 100 can be controlled by the liquid level control system 120 such that the liquid level is above the contact zone 106. Additionally or alternatively, the level of liquid sulfur in the degassing vessel 100 can be controlled by the liquid level control system 120 such that greater than 50, 60, 70, 80, 90, or 100% of the contact zone 106 is submerged in the liquid. Additionally or alternatively, the level of liquid sulfur in the degassing vessel 100 can be controlled by the liquid level control system 120 such that the liquid level in the degassing vessel 100 is below the outlet 402 of the vessel structure 401 of the decomposition zone 400. Additionally or alternatively, the level of liquid sulfur in the degassing vessel 100 can be controlled by the liquid level control system 120 such that the liquid level is above the outlet 402 of the vessel structure 401. Additionally or alternatively, the level of liquid sulfur in the degassing vessel 100 can be controlled by the liquid level control system 120 such that the liquid level is at a height in the degassing vessel which is above the height of the catalyst bed 302 as measured relative to the degassing vessel 100.

FIG. 4 illustrates the polysulfide decomposition catalyst 301 is included in a catalyst bed 302 in a polysulfide decomposition zone 510 contained in a vessel structure 500 that is separate from and upstream of the degassing vessel 100. The conduit 102 is connected to the vessel structure 500. The first stream that contains liquid sulfur, polysulfides and hydrogen sulfide flows via the conduit 102 into the vessel structure 500. The catalyst bed 302 in the vessel structure 500 can be a fixed bed of decomposition catalyst 301. Conduit 501 is connected to the vessel structure 500, and liquid sulfur enriched with hydrogen sulfide flows from the vessel structure 500 in conduit 501. Conduit 501 is connected to the degassing vessel 100 and is configured to introduce the liquid sulfur enriched with hydrogen sulfide into the interior 112 of the degassing vessel 100 at a point that is above the liquid distributor 103. Conduit 501 can extend into the interior 112 of the degassing vessel and be configured to connect directly to the liquid distributor 103. The angle and contour of the piping of conduit 501 in the interior 112 of the degassing vessel 100 can be any angle or contour suitable for extending outside the degassing vessel 100 so that one end 501a of the conduit 501 connects to the vessel structure 500 located outside the degassing vessel 100 and the opposite end 501b connects to the liquid distributor 103 in the interior 112 of the degassing vessel 100.

In FIG. 4, it can be seen that the first conduit 202 of the liquid level control system 120 is fluidly connected to the liquid in the contact zone 106 in the degassing vessel 100. FIG. 4 illustrates the first conduit 202 can be fluidly connected to an upper portion of the contact zone 106; however, it is also contemplated that the first conduit 202 can be fluidly connected to a middle portion or a lower portion of the contact zone 106. It is further contemplated that the first conduit 202 can be fluidly connected to an interior space 116 of the degassing vessel 100 that is below the contact zone 106 and above the gas distributor 105.

It can also be seen in FIG. 4 that the second conduit 203 is fluidly connected to a vapor space 306 of the degassing vessel 100 that is above the liquid distributor 103, above the contact zone 106, at a height above the liquid level of liquid sulfur in the degassing vessel 100.

In FIG. 4, the level of liquid sulfur in the degassing vessel 100 can be controlled by the liquid level control system 120 such that the liquid level is between the first conduit 202 and the second conduit 203 of the liquid level control system 120. Additionally or alternatively, the level of liquid sulfur in the degassing vessel 100 can be controlled by the liquid level control system 120 such that the liquid level is below the liquid distributor 103. Additionally or alternatively, the level of liquid sulfur in the degassing vessel 100 can be controlled by the liquid level control system 120 such that the liquid level is above the contact zone 106. Additionally or alternatively, the level of liquid sulfur in the degassing vessel 100 can be controlled by the liquid level control system 120 such that greater than 50, 60, 70, 80, 90, or 100% of the contact zone 106 is submerged in the liquid. Additionally or alternatively, the level of liquid sulfur in the degassing vessel 100 can be controlled by the liquid level control system 120 such that the liquid level is below conduit 501. Additionally or alternatively, the level of liquid sulfur in the degassing vessel 100 can be controlled by the liquid level control system 120 such that the liquid level is above conduit 501.

Figure 5:
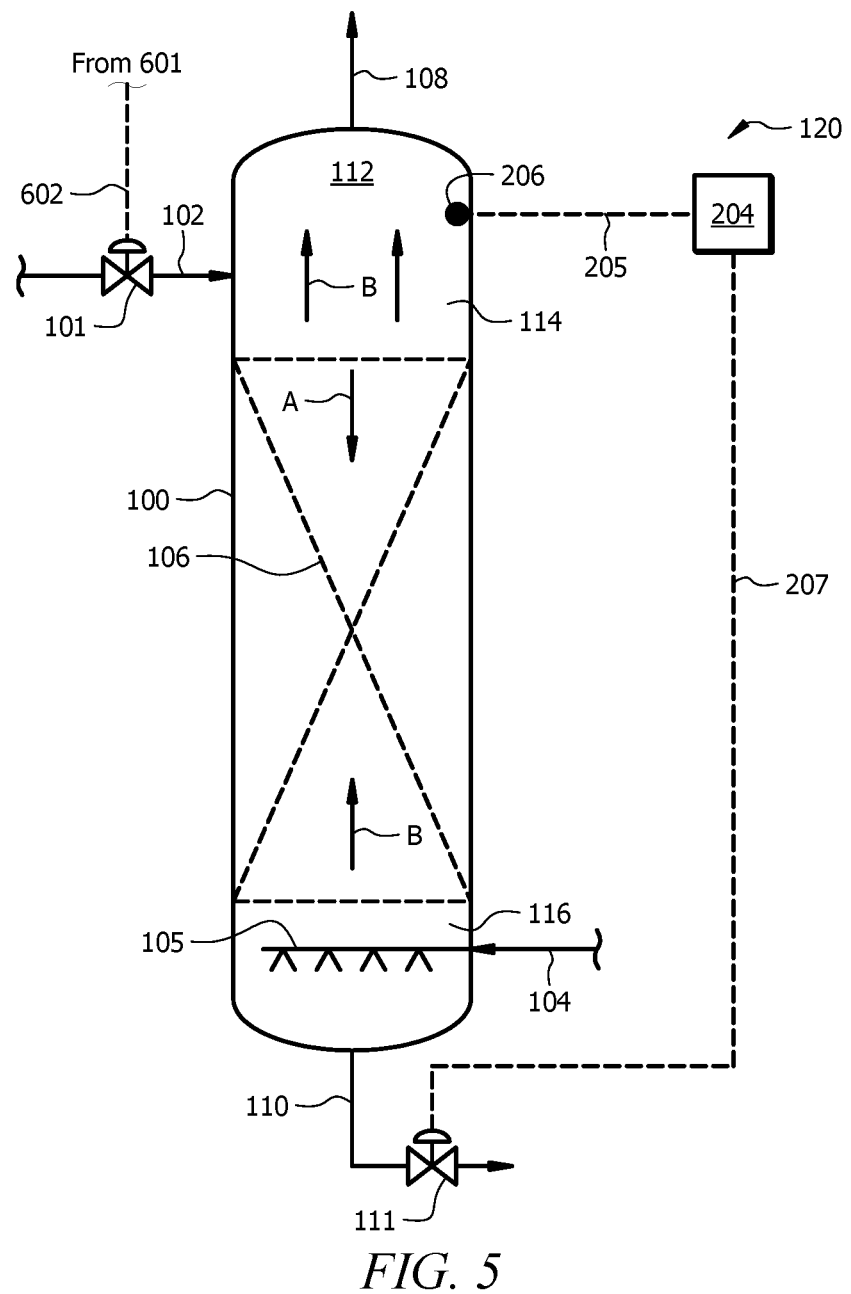
FIGS. 5, 6, and 7 illustrate liquid sulfur degassing configurations and operation similar to that of FIGS. 1, 3, and 4, respectively, except no liquid distributor is used and the level controller is directly connected to the degassing vessel.
Figure 6:
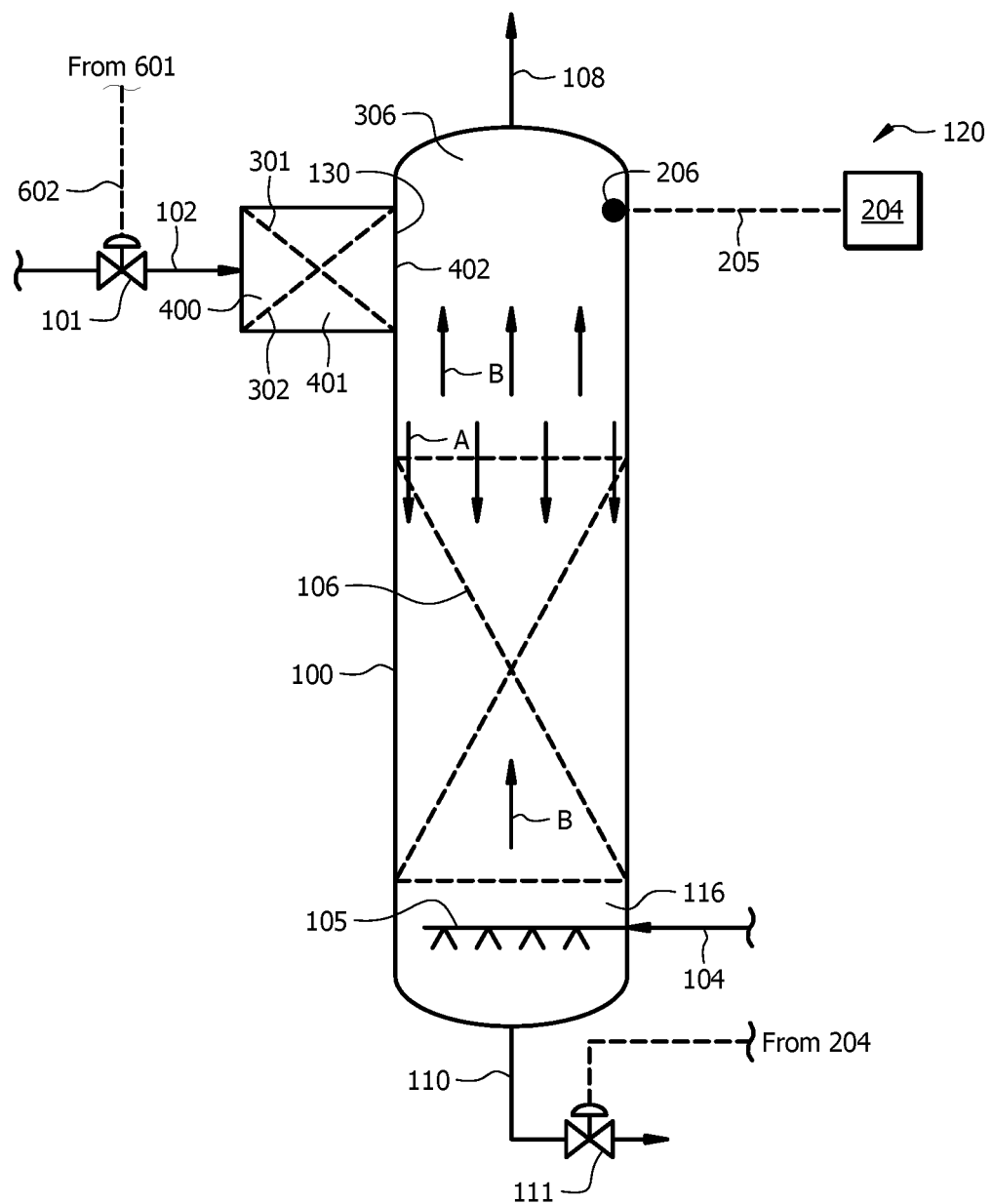
Figure 7:
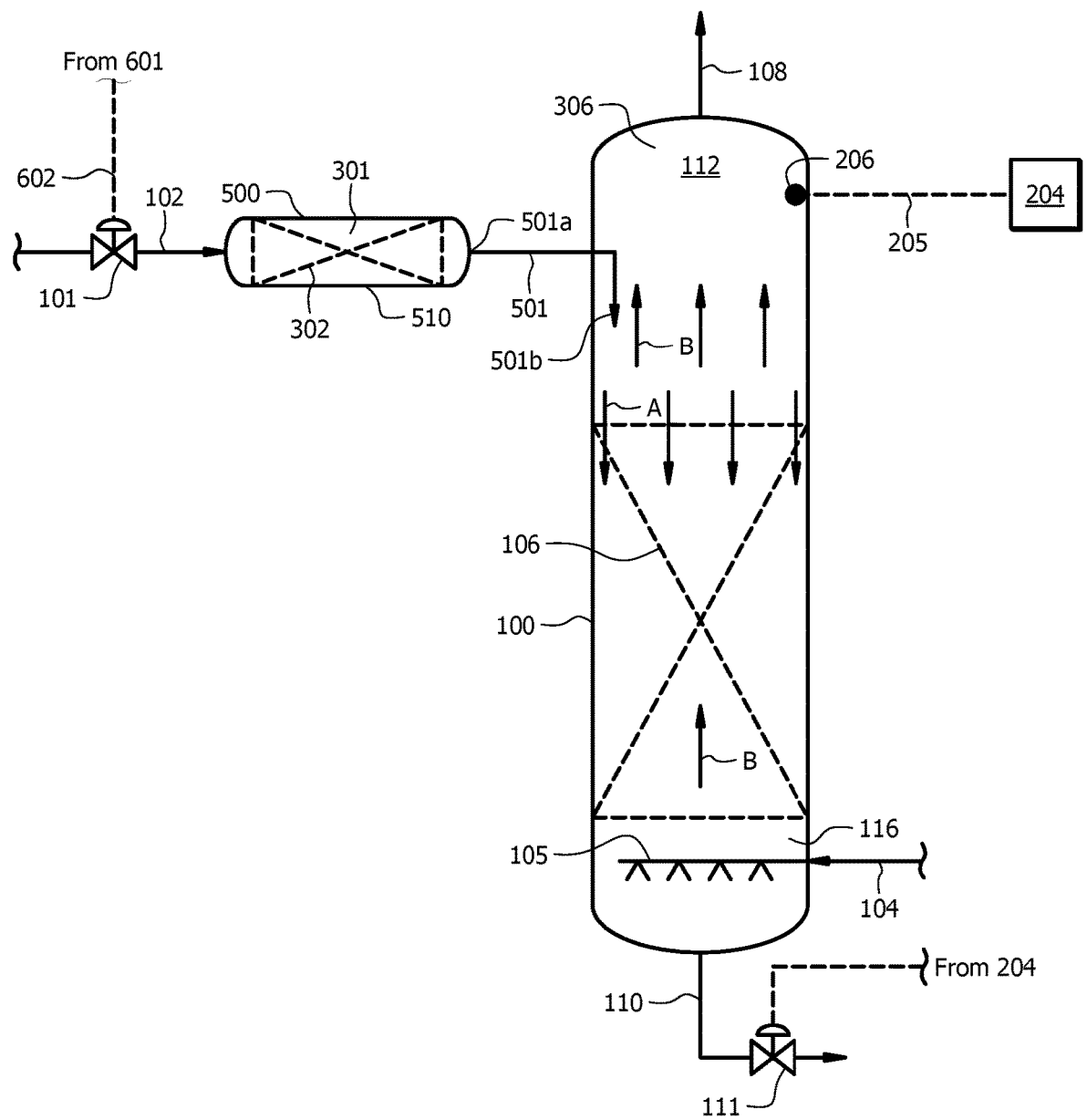

FIGS. 5, 6, and 7 illustrate a liquid sulfur degassing configuration and operation similar to that of FIGS. 1, 3, and 4, respectively, except no liquid distributor is used and the liquid level controller 204 is directly connected to the degassing vessel 100. In aspects of FIGS. 5, 6, and 7, the controller 204 can be configured to measure the level of liquid in the degassing vessel 100 using signals obtains from the sensor(s) 206 via capacitance technology. In an aspect, the sensor(s) 206 can be placed in the top head of the degassing vessel 100 for FIGS. 5, 6, and 7.

In FIGS. 5-7, the controller 204 is configured to measure a level of liquid sulfur in the degassing vessel 100 based on the signals obtained from sensor 206 via link 205. The controller 204 then can determine the level of liquid sulfur in the degassing vessel 100 based on the measurement and send a signal via link 207 to adjust, if needed the control valve 111 in the conduit 110 so as to adjust the level of liquid in the degassing vessel 100.

In FIGS. 5-7, the level of liquid sulfur in the degassing vessel 100 can be controlled by the controller 204 such that the liquid level is below the point where liquid sulfur is introduced into the degassing vessel 100. Additionally or alternatively, the level of liquid sulfur in the degassing vessel 100 can be controlled by the controller 204 such that the liquid level is above the contact zone 106. Additionally or alternatively, the level of liquid sulfur in the degassing vessel 100 can be controlled by the controller 204 such that the liquid level is above the point where liquid sulfur is introduced to the degassing vessel 100. Additionally or alternatively in FIG. 7, the level of liquid sulfur in the degassing vessel 100 can be controlled by the controller 204 such that the liquid level is below conduit 501. Additionally or alternatively, the level of liquid sulfur in the degassing vessel 100 can be controlled by the controller 204 such that the liquid level is above the point where liquid sulfur conduit 501 is introduced to the degassing vessel 100.

In FIG. 7, the end 501*a* of the conduit 501 is connected to the vessel structure 500; however, the opposite end 501*b* is not connected to a liquid distributor because the configuration in FIG. 7 contains no liquid distributor. Aspects of FIG. 7 include configurations of conduit 501 where the opposite end 501*b* connects directly to the side 130 of the degassing vessel 100 or where the opposite end 501*b* extends into the interior 112 of the degassing vessel 100.

It is contemplated that embodiments within the scope of the disclosure can include the liquid level control system 120 of FIGS. 1-4 and can have no liquid distributor as shown in FIGS. 5-7. It is also contemplated that embodiments can include a liquid distributor 103 as shown in FIGS. 1-4 while having controller 204 connected directly to the degassing vessel 100 (i.e., no use of level bridle 201) as shown in FIGS. 5-7.

FIGS. 8-11 illustrate additional embodiments of degassing vessels configured for liquid sulfur degassing in a manner similar to the degassing vessels illustrated in FIGS. 1-4.

In FIGS. 8-11, the control valve 101 that is placed in conduit 102 is also connected to controller 204 and is part of the liquid level control system 120. The flow of the first stream in conduit 102 can be controlled with the liquid level control system 120 to maintain the contact zone 106 in a submerged configuration. Upon the liquid level control system 120 indicating that the contact zone 106 is at or near a configuration of incomplete submergence, the flow of the first stream in conduit 102 may be increased. The flow is also controlled to provide a preselected residence time in the degassing vessel 100, to achieve a desired level of polysulfides removal from the first stream, and/or to achieve a desired level of hydrogen sulfide gas removal from the first stream. The controller 204 can be electrically connected to a first control valve 101 via link 208 and/or to a second control valve 111 via link 207. The controller 204 can be configured to send a signal to actuate the control valve 101 via link 208 and/or control valve 111 via link 207 so as allow liquid to flow into the degassing vessel via conduit 102 or allow liquid to flow out of the degassing vessel via the conduit 110. Actuating the control valve 101 and/or control valve 111 can control the level of liquid in the degassing vessel 100 based on the measurements obtained from the level bridle 201.

Other aspects of the degassing vessels in FIGS. 8-11 are the same as described for FIGS. 1-4.

Also contemplated within this disclosure is a retro-fit of a decomposition zone that is coupled to an existing degassing vessel 100. Using FIG. 1 and one of FIG. 3, 6, or 10 for illustration, retrofitting a degassing vessel 100 to include a decomposition zone can include: detaching a first conduit 102 from an inlet of the degassing vessel 100; attaching an outlet of a vessel structure 401 configured to hold a decomposition catalyst to the inlet of the degassing vessel 100; and attaching an inlet of the vessel structure 401 to the first conduit 102. The retrofitting in this aspect does not change a configuration of the degassing vessel 100. Retrofitting can further include placing a decomposition catalyst 301 in the vessel structure 401. The decomposition catalyst 301 can be of embodiments and aspects described herein, and the decomposition catalyst 301 can be in a catalyst bed 302 configured to hold the decomposition catalyst 301 in place to minimize mechanical damage to the catalyst particles or the vessel structure 401 can be configured to hold the decomposition catalyst 301 in place to minimize mechanical damage to the catalyst particles. Retrofitting can also include detaching an existing liquid level controller 204 from the degassing vessel 100, attaching a level bridle 201 of a configuration disclosed herein to the degassing vessel 100 (e.g., via conduits 202 and 203), and attaching the level bridle 201 to the existing liquid level controller 204 or a second liquid level controller.

Also contemplated within this disclosure is a retro-fit of a decomposition zone that is coupled to an existing degassing vessel 100. Using FIG. 1 and one of FIG. 4, 7, or 11 for illustration, retrofitting a degassing vessel 100 to include a decomposition zone can include: detaching a first conduit 102 from an inlet of the degassing vessel 100; attaching a first end of a hydrogen sulfide enriched conduit 501 to the inlet of the degassing vessel 100; attaching a second end of the hydrogen sulfide enriched conduit 501 to a vessel structure 500; and attaching an inlet of the vessel structure 500 to the first conduit 102. The retrofitting in this aspect does not change a configuration of the degassing vessel 100.

Retrofitting can further include placing a decomposition catalyst 301 in the vessel structure 500. The decomposition catalyst 301 can be of embodiments and aspects described herein, and the decomposition catalyst 301 can be in a catalyst bed 302 configured to hold the decomposition catalyst 301 in place to minimize mechanical damage to the catalyst particles or the vessel structure 500 can be configured to hold the decomposition catalyst 301 in place to minimize mechanical damage to the catalyst particles. Retrofitting can also include detaching an existing liquid level controller 204 from the degassing vessel 100, attaching a level bridle 201 of a configuration disclosed herein to the degassing vessel 100 (e.g., via conduits 202 and 203), and attaching the level bridle 201 to the existing liquid level controller 204 or a second liquid level controller.

Each of the configurations in FIGS. 1-11 addresses the problem of inaccurate liquid level control when froth is present in the degassing vessel 100.

For FIGS. 2-4, 6-7, and 9-11, any catalyst configured to catalyze the decomposition of polysulfides in liquid sulfur to hydrogen sulfide can be used as the decomposition catalyst. Suitable catalysts include granular Claus or Claus like catalyst material, and especially porous alumina oxide or metal oxides supported on alumina oxide, non-promoted or promoted activated alumina, and titania catalysts along with a alumina-titania composite, all of which may be structured, or coated onto a metal or ceramic support to enhance the decomposition of polysulfides to hydrogen sulfide, and to allow hydrogen sulfide to be stripped from the sulfur at typically low to moderate pressure with the use of a stripping gas.

Each of the configurations in FIGS. 2-4, 6-7, and 9-11 utilize a decomposition catalyst that can dissociate the polysulfides into hydrogen sulfide and sulfur, which is easier to remove from liquid sulfur using the stripping gas.

Each of the configurations in FIGS. 2-4, 6-7, and 9-11 need lower flow of stripping gas, thus saving operating costs. This is because catalytic decomposition of polysulfides to hydrogen sulfide and sulfur allow for lower operating pressures that results in the primary mode of hydrogen sulfide removal being stripping instead of oxidation (oxidation as a means for hydrogen sulfide removal is favored by higher pressures than stripping).

Each of the configurations in FIGS. 2-4, 6-7, and 9-11 can catalytically decompose polysulfides to hydrogen sulfide and sulfur without mechanical damage to the catalyst.

The degassing vessel 100 in FIGS. 1-11 can be operated under any suitable conditions. In an aspect, the degassing vessel 100 may be operated at a pressure range of about 0.03 Mpag to about 1.38 Mpag (about 5 psig to about 200 psig); alternatively, about 0.03 Mpag to about 0.35 Mpag (about 5 psig to about 50 psig); alternatively, about 0.20 Mpag to about 0.83 Mpag (about 30 psig to about 120 psig); alternatively, about 0.27 Mpag to about 0.55 Mpag (about 40 psig to about 80 psig). The degassing vessel 100 pressure can be controlled by regulating the flow rate of the overhead stream in conduit 108 via a flow control system having a controller of the hardware described for other controllers 204 and 601 herein. In an aspect, the degassing vessel 100 can be operated such that a residence time of the liquid sulfur is in a range of 1 second to 2 hours.

Figure 8:
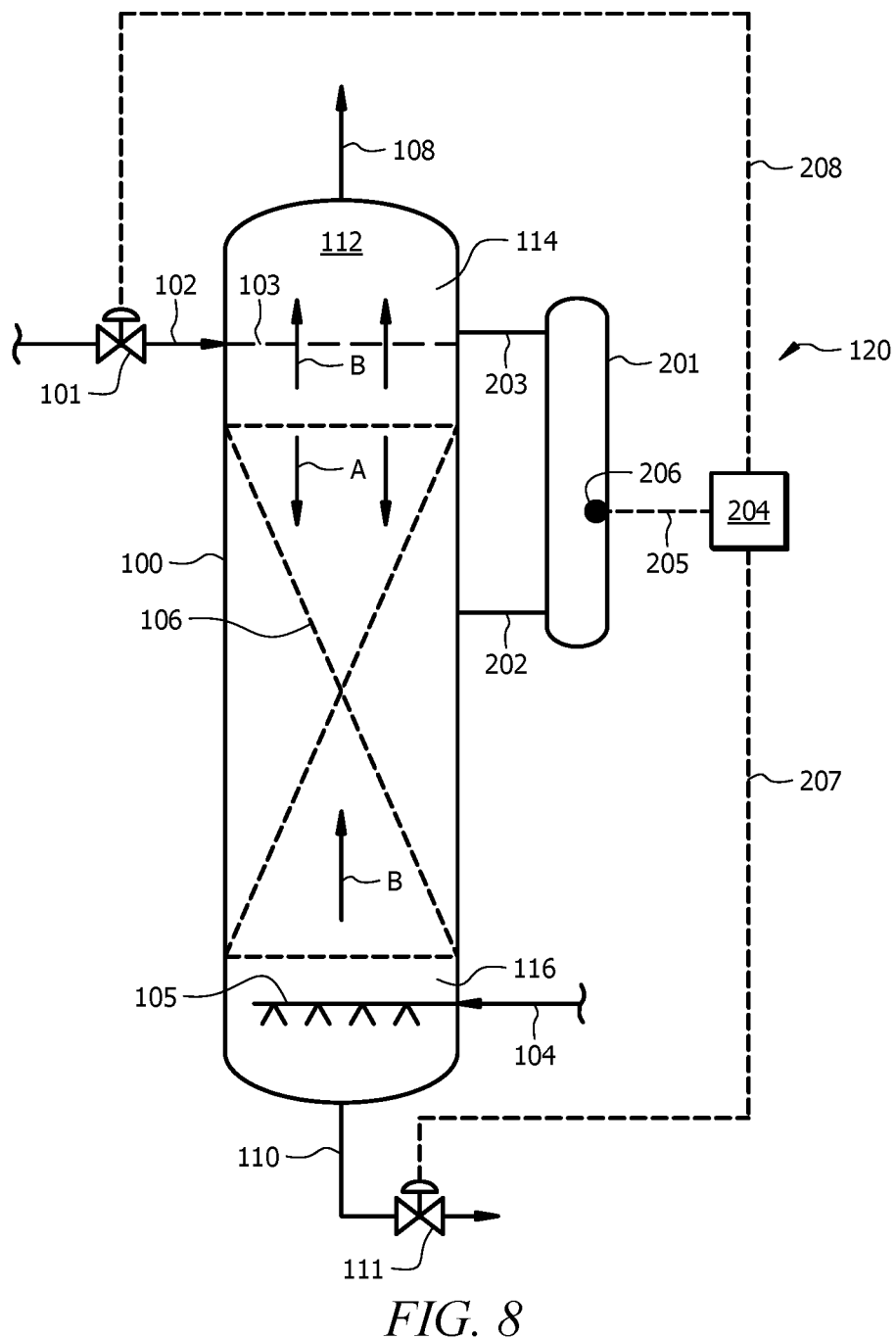
FIG. 8 illustrates another process flow diagram of a degassing vessel configured for liquid sulfur degassing.
Figure 9:
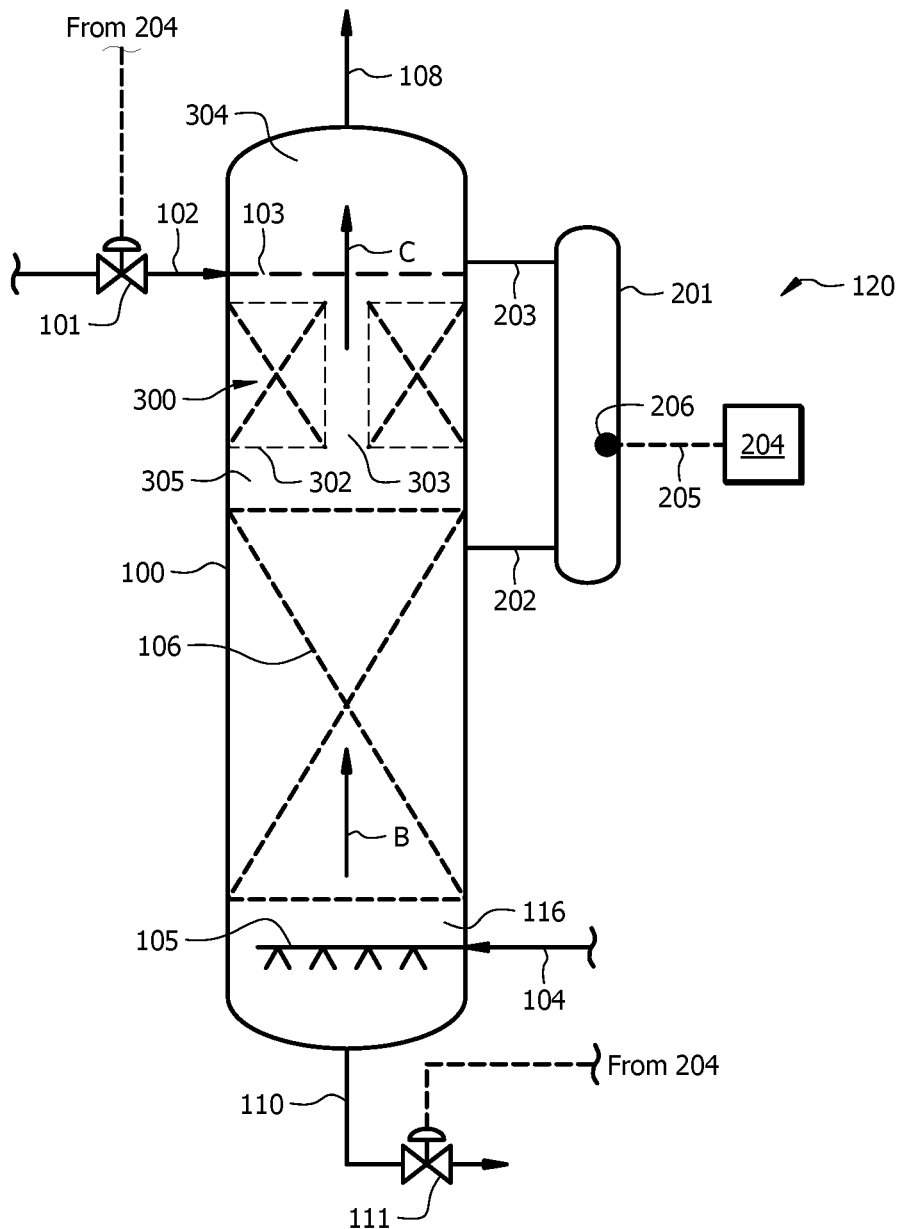
FIG. 9 illustrates another process flow diagram of a degassing vessel configured for liquid sulfur degassing.
Figure 10:
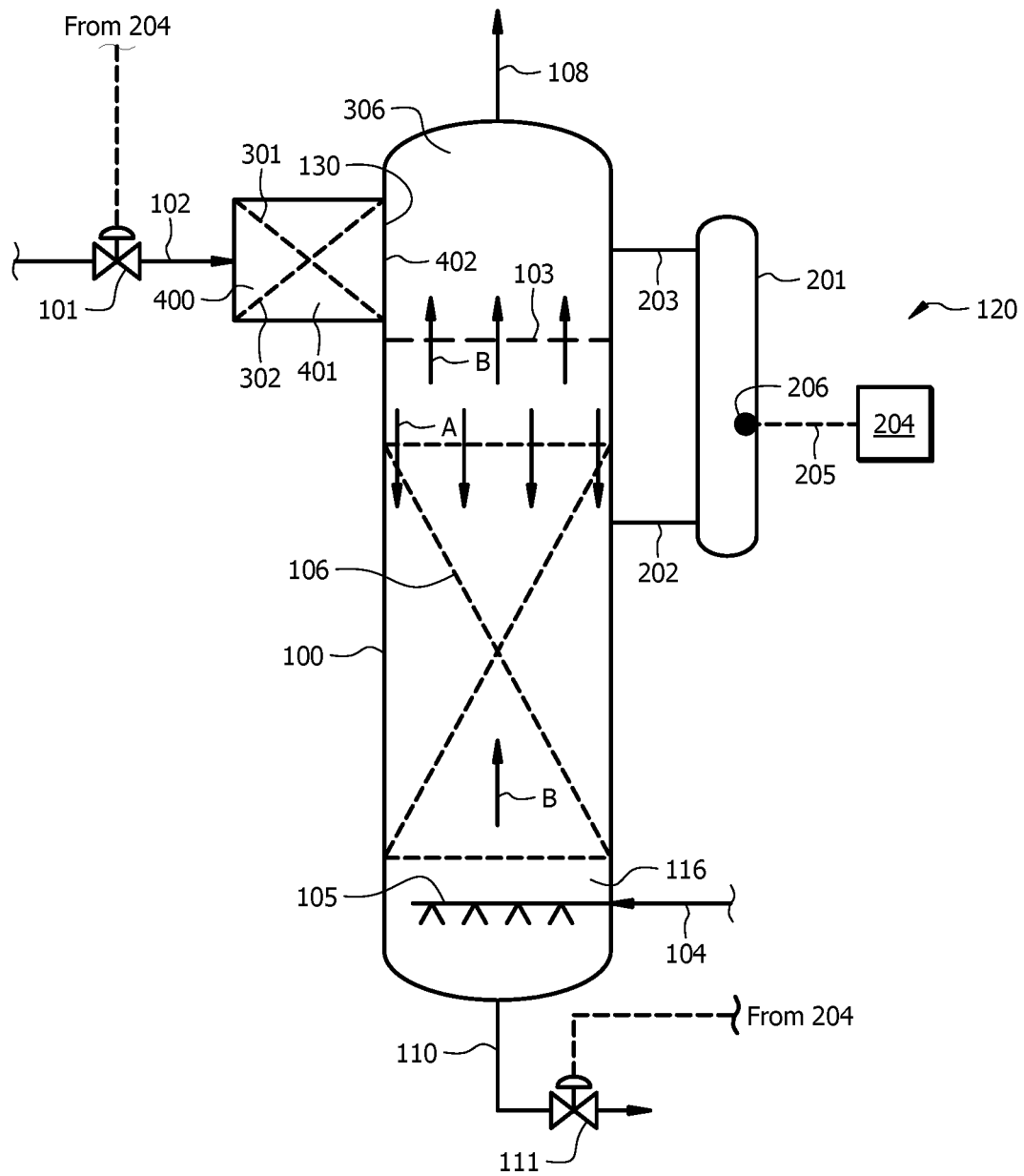
FIG. 10 illustrates another process flow diagram of a degassing vessel configured for liquid sulfur degassing.
Figure 11:
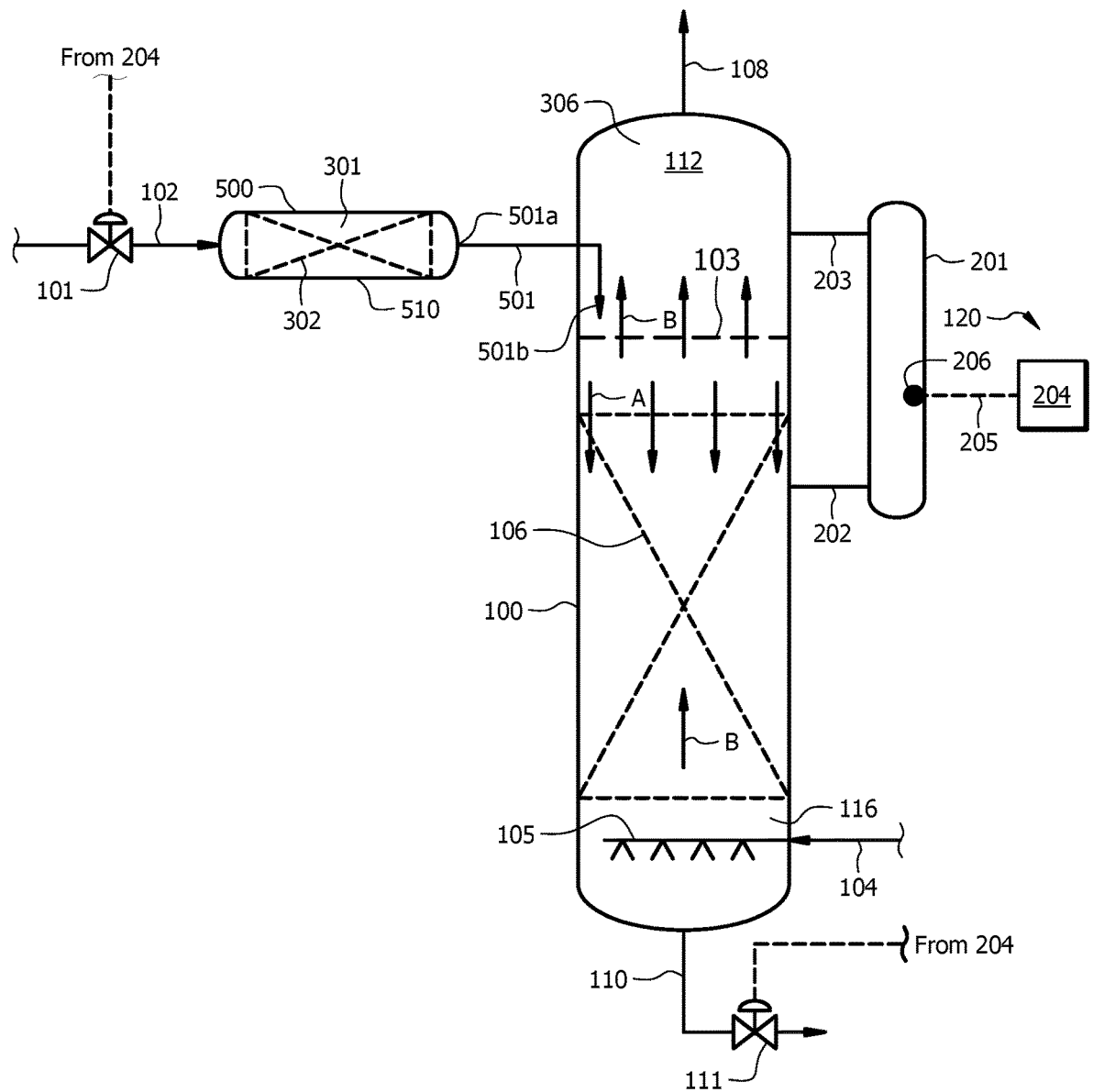
FIG. 11 illustrates another process flow diagram of a degassing vessel configured for liquid sulfur degassing.

Conditions in the degassing vessel 100 of FIGS. 1, 5, and 8 can also include elevated pressure (e.g., about 0.20 Mpag to about 1.38 Mpag (about 30 psig to about 200 psig)) which promotes the liquid phase oxidation of polysulfides and hydrogen sulfide by oxygen provided by the stripping gas and dissolved in sulfur.

Conditions in the degassing vessel 100 of FIGS. 2-4, 6-7, and 9-11 include lower operating pressure (e.g., about 0.03 MPag to about 0.20 MPag (about 5 psig to about 30 psig)) because the catalytic decomposition of polysulfides to hydrogen sulfide allows lower operating pressures at which hydrogen sulfide can be stripped from hydrogen sulfide enriched liquid sulfur. The lower operating pressure reduces the corrosion potential of the degassing equipment by decreasing the water dew point temperature.

Catalytic decomposition of polysulfides also can allow for shorter residence time and smaller degassing equipment.

While various embodiments have been shown and described, modifications thereof can be made by one skilled in the art without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$ and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, 90, 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

Additional Description

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While systems and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Having described various systems and processes herein, specific embodiments or aspects can include, but are not limited to:

Embodiments disclosed herein include:

A: A liquid sulfur degassing system that includes: a degassing vessel configured to receive liquid sulfur and a stripping gas therein and to contact the liquid sulfur with the stripping gas so as to produce a bottom stream comprising degassed liquid sulfur and an overhead stream comprising a hydrogen sulfide enriched stripping gas; and a liquid level controller directly or indirectly connected to the degassing vessel and configured to: determine a level of the liquid sulfur in the degassing vessel; and control a level of the liquid sulfur in the degassing vessel based on the level of the liquid sulfur determined for the degassing vessel.

B. A liquid sulfur degassing system that includes: a degassing vessel configured to receive liquid sulfur and a stripping gas therein and to contact the liquid sulfur with the stripping gas so as to produce a bottom stream comprising degassed liquid sulfur and an overhead stream comprising a hydrogen sulfide enriched stripping gas; a level bridle fluidly connected to the degassing vessel; and a liquid level controller connected to the level bridle and configured to: measure a first level of the liquid sulfur in the level bridle; and control a level of the liquid sulfur in the degassing vessel based on the first level measured for the level bridle.

C: A method of treating liquid sulfur containing polysulfides and hydrogen sulfide, that includes: contacting the liquid sulfur with stripping gas in a contact zone of a degassing vessel; determining a level of the liquid sulfur in the degassing vessel; and controlling the level of the liquid sulfur in the degassing vessel based on the step of determining.

D: A method of treating liquid sulfur containing polysulfides and hydrogen sulfide, that includes: contacting the liquid sulfur with stripping gas in a contact zone of a degassing vessel; and measuring a first level of the liquid sulfur in a level bridle that is fluidly connected to the degassing vessel and configured to indicate a second liquid level of the liquid sulfur in the degassing vessel; and controlling the second level of the liquid sulfur in the degassing vessel based on the step of measuring.

E: A method for retro-fitting a decomposition zone to an existing degassing vessel includes one or more of: detaching a liquid sulfur feed conduit from an inlet of the degassing vessel; attaching an outlet of a vessel structure configured to hold a decomposition catalyst to the inlet of the degassing vessel; attaching an inlet of the vessel structure to the liquid sulfur feed conduit; placing a decomposition catalyst in the vessel structure; detaching an existing liquid level controller from the degassing vessel; attaching a level bridle of a configuration disclosed herein to the degassing vessel; and attaching the level bridle to the existing liquid level controller or a second liquid level controller F: A method for retro-fitting a decomposition zone to an existing degassing vessel includes one or more of: detaching a liquid sulfur feed conduit from an inlet of the degassing vessel; attaching a first end of a hydrogen sulfide enriched conduit to the inlet of the degassing vessel; attaching a second end of the hydrogen sulfide enriched conduit to a vessel structure; attaching an inlet of the vessel structure to the liquid sulfur feed conduit; detaching an existing liquid level controller from the degassing vessel; attaching a level bridle of a configuration disclosed herein to the degassing vessel; and attaching the level bridle to the existing liquid level controller or a second liquid level controller.

G: Each of embodiments A, B, C, D, E, and F may have one or more of the following additional elements: Element 1: wherein controlling the level of the liquid sulfur is not affected by froth in the degassing vessel. Element 2: wherein controlling the level comprises actuating a control valve located in a second stream comprising degassed liquid sulfur. Element 3: further comprising before contacting the liquid sulfur with a stripping gas, contacting the liquid sulfur with a decomposition catalyst. Element 4: further comprising before contacting the liquid sulfur with a stripping gas, contacting the liquid sulfur with a decomposition catalyst. Element 5: wherein the decomposition catalyst is in a catalyst bed. Element 6: wherein the catalyst bed is paced in the degassing vessel and above the contact zone. Element 7: wherein the catalyst bed is a ring-shaped catalyst bed. Element 8: wherein the catalyst bed is attached to an upper side of the degassing vessel. Element 9: wherein the catalyst bed is in a second vessel, the method further comprising receiving a liquid sulfur feed stream into the second vessel, and flowing a hydrogen sulfide enriched liquid sulfur stream from the second vessel to the degassing vessel. Element 10: wherein determining the level of the liquid sulfur in the degassing vessel comprises measuring a second level of the liquid sulfur in a level bridle that is fluidly connected to the degassing vessel, and determining the level of the liquid sulfur in the degassing vessel based on the second level measured in the level bridle. Element 11: wherein the level bridle is fluidly connected to the degassing vessel by a first conduit and a second conduit, wherein the first conduit is in fluid communication with the liquid sulfur in the degassing vessel, wherein the second conduit is in fluid communication with a vapor space of the degassing vessel.

H: Each of embodiments A, B, C, D, E, and F may have one or more of the following additional elements: Element 1: wherein controlling the second level of the liquid sulfur is not affected by froth in the degassing vessel. Element 2: wherein controlling the second level comprises actuating a first control valve located in a first stream comprising liquid sulfur, polysulfides, and hydrogen sulfide; or actuating a second control valve located in a second stream comprising degassed liquid sulfur. Element 3: further comprising before contacting the liquid sulfur with a stripping gas, contacting the liquid sulfur with a decomposition catalyst. Element 4: further comprising before contacting the liquid sulfur with a stripping gas, contacting the liquid sulfur with a decomposition catalyst. Element 5: wherein the decomposition catalyst is in a catalyst bed. Element 6: wherein the catalyst bed is paced in the degassing vessel and above the contact zone. Element 7: wherein the catalyst bed is a ring-shaped catalyst bed. Element 8: wherein the catalyst bed is attached to an upper side of the degassing vessel. Element 9: wherein the catalyst bed is in a second vessel, the method further comprising receiving a liquid sulfur feed stream into the second vessel, and flowing a hydrogen sulfide enriched liquid sulfur stream from the second vessel to the degassing vessel.

I: Each of embodiments A, B, C, D, E, and F may have one or more of the following additional elements: Element 1: further comprising a level bridle fluidly connected to the degassing vessel, wherein the liquid level controller is configured to determine the level of liquid sulfur in the degassing vessel by measuring a second level of the liquid sulfur in the level bridle. Element 2: wherein the determine and control by the liquid level controller are not affected by froth in the degassing vessel. Element 3: further comprising: a control valve coupled to the degassing vessel; wherein the liquid level controller is configured to: actuate the control valve so as to allow a flow of degassed liquid sulfur from the degassing vessel. Element 4: further comprising: a first conduit configured to fluidly couple the degassing vessel to the level bridle; and a second conduit configured to fluidly couple the degassing vessel to the level bridle, wherein the first conduit is in fluid communication with the liquid sulfur in the degassing vessel, wherein the second conduit is in fluid communication with a vapor space of the degassing vessel. Element 5: further comprising a decomposition catalyst placed in the degassing vessel. Element 6: wherein the decomposition catalyst is in a catalyst bed that is placed above a contact zone of the degassing vessel. Element 7: wherein the catalyst bed is a ring-shaped catalyst bed. Element 8: wherein the decomposition catalyst is in a catalyst bed that is attached to an upper side of the degassing vessel. Element 9: wherein the decomposition catalyst is in a catalyst bed that is in a second vessel.

J: Each of embodiments A, B, C, D, E, and F may have one or more of the following additional elements: Element 1: wherein the measurement and control by the liquid level controller is not affected by froth in the degassing vessel. Element 2: further comprising a first control valve coupled to the degassing vessel, and a second control valve coupled to the degassing vessel, wherein the liquid level controller is configured to: actuate the first control valve so as to allow a flow of liquid sulfur, polysulfides, and hydrogen sulfide to the degassing vessel, or actuate the second control valve so as to allow a flow of degassed liquid sulfur from the degassing vessel. Element 3: further comprising a first conduit configured to fluidly couple the degassing vessel to the level bridle; and a second conduit configured to fluidly couple the degassing vessel to the level bridle. Element 4: further comprising a decomposition catalyst placed in the degassing vessel. Element 5: wherein the decomposition catalyst is in a catalyst bed that is placed above a contact zone of the degassing vessel. Element 6: wherein the catalyst bed is a ring-shaped catalyst bed. Element 7: wherein the decomposition catalyst is in a catalyst bed that is attached to an upper side of the degassing vessel. Element 8: wherein the decomposition catalyst is in a catalyst bed that is in a second vessel.

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A method of treating liquid sulfur containing polysulfides and hydrogen sulfide, comprising:
    contacting the liquid sulfur with stripping gas in a contact zone of a degassing vessel, thereby froth is formed in the degassing vessel and there is a level of froth in the degassing vessel;
    determining a level of the liquid sulfur in the degassing vessel, wherein the determining the level of the liquid sulfur in the degassing vessel comprises:
        measuring a second level of the liquid sulfur via a sensor in a level bridle that is fluidly connected to the degassing vessel, wherein the sensor is configured to measure liquid level via differential pressure, radar, capacitance, or combinations thereof, where the second level is different than the level of froth present on the liquid sulfur within the degassing vessel; and
        determining the level of the liquid sulfur in the degassing vessel based on the second level measured in the level bridle by analyzing and calculating the level of the liquid sulfur in the degassing vessel based on correlation data stored on the memory of a controller; and
    controlling the level of the liquid sulfur in the degassing vessel based on the step of determining the level of the liquid sulfur in the degassing vessel.

2. The method of claim 1, wherein the froth in the degassing vessel results from the contacting, wherein the controlling the level of the liquid sulfur is not affected by the froth in the degassing vessel.

3. The method of claim 1, wherein the controlling the level of the liquid sulfur comprises:
    actuating a control valve located in a conduit comprising degassed liquid sulfur.

4. The method of claim 1, further comprising:
    before contacting the liquid sulfur with the stripping gas, contacting the liquid sulfur with a decomposition catalyst.

5. The method of claim 4, wherein the decomposition catalyst is in a catalyst bed.

6. The method of claim 5, wherein the catalyst bed is placed in the degassing vessel and above the contact zone.

7. The method of claim 6, wherein the catalyst bed is a ring-shaped catalyst bed.

8. The method of claim 5, wherein the catalyst bed is attached to a portion side of the degassing vessel.

9. The method of claim 5, wherein the catalyst bed is in a second vessel, the method further comprising:
    receiving a liquid sulfur feed stream into the second vessel; and
    flowing a hydrogen sulfide enriched liquid sulfur stream from the second vessel to the degassing vessel.

10. The method of claim 1, wherein the level bridle is fluidly connected to the degassing vessel by a first conduit and a second conduit, wherein the first conduit is in fluid communication with the liquid sulfur in the degassing vessel, wherein the second conduit is in fluid communication with a vapor space of the degassing vessel.

* * * * *